United States Patent
Satake et al.

(10) Patent No.: US 11,175,661 B2
(45) Date of Patent: Nov. 16, 2021

(54) VEHICLE TRAVELING CONTROL DEVICE AND VEHICLE TRAVELING CONTROL METHOD

(71) Applicant: Mitsubishi Electric Corporation, Tokyo (JP)

(72) Inventors: Toshihide Satake, Tokyo (JP); Kazuo Hitosugi, Tokyo (JP); Takahiro Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 354 days.

(21) Appl. No.: 15/489,881

(22) Filed: Apr. 18, 2017

(65) Prior Publication Data

US 2018/0039270 A1 Feb. 8, 2018

(30) Foreign Application Priority Data

Aug. 4, 2016 (JP) .............................. JP2016-153343

(51) Int. Cl.
*G05D 1/00* (2006.01)
*G05D 1/02* (2020.01)
(Continued)

(52) U.S. Cl.
CPC ........... *G05D 1/0088* (2013.01); *B60W 30/00* (2013.01); *G01C 21/30* (2013.01);
(Continued)

(58) Field of Classification Search
None
See application file for complete search history.

(56) References Cited

U.S. PATENT DOCUMENTS 6,317,683 B1 * 11/2001 Ciprian .................. G01C 21/30
701/118
10,754,348 B2 * 8/2020 McClendon .............. E01F 9/50
(Continued)

FOREIGN PATENT DOCUMENTS

DE 10000919 A1 * 7/2001 ............. G01S 13/86
JP 6-34381 A 2/1994
(Continued)

OTHER PUBLICATIONS

English translation of DE 10000919 Abstract (Year: 2001).*
(Continued)

*Primary Examiner* — Donald J Wallace
(74) *Attorney, Agent, or Firm* — Sughrue Mion, PLLC; Richard C. Turner

(57) ABSTRACT

In the vehicle traveling control device, a host vehicle location specification unit specifies a host vehicle location on a map. A first peripheral information detector detects a location of a planimetric feature or characteristics of a road in a periphery of the host vehicle on the basis of map data and the host vehicle location on the map specified by the host vehicle location specification unit. A second peripheral information detector detects a location of a planimetric feature or characteristics of a road in the periphery of the host vehicle on the basis of information acquired by a camera, a sensor, or a road-vehicle communication device mounted on the host vehicle. When the detection result from the first peripheral information detector and the detection result from the second peripheral information detector do not coincide, an automatic driving restriction unit restricts performance of automatic driving of the host vehicle.

3 Claims, 8 Drawing Sheets

(51) Int. Cl.
 *B60W 30/00* (2006.01)
 *G01C 21/36* (2006.01)
 *G01C 21/30* (2006.01)

(52) U.S. Cl.
 CPC ....... *G01C 21/3602* (2013.01); *G05D 1/0231* (2013.01); *G05D 1/0246* (2013.01); *G05D 1/0274* (2013.01); *G05D 1/0278* (2013.01); *G05D 2201/0213* (2013.01)

(56) References Cited

U.S. PATENT DOCUMENTS

| | | | | |
|---|---|---|---|---|
| 2004/0015274 A1* | 1/2004 | Wilkins, Jr. | ......... | G01C 23/005 701/3 |
| 2004/0236490 A1* | 11/2004 | Kin | ....... | B60W 10/18 701/70 |
| 2005/0189161 A1* | 9/2005 | Zheng | ............ | B62D 6/003 180/402 |
| 2006/0267502 A1* | 11/2006 | Kubota | ........ | B60Q 1/143 315/82 |
| 2010/0169013 A1* | 7/2010 | Nakamura | ........ | G08G 1/0969 701/469 |
| 2012/0197519 A1* | 8/2012 | Richardson | ........ | G01C 21/3647 701/408 |
| 2015/0073705 A1* | 3/2015 | Hiwatashi | ........ | G01C 21/3602 701/468 |
| 2016/0305787 A1* | 10/2016 | Sato | ........ | G05D 1/0088 |
| 2017/0151960 A1* | 6/2017 | Fujiki | ........ | B60W 10/08 |
| 2018/0004211 A1* | 1/2018 | Grimm | ........ | G05D 1/0214 |

FOREIGN PATENT DOCUMENTS

| | | |
|---|---|---|
| JP | 8-30899 A | 2/1996 |
| JP | 2014-34251 A | 2/2014 |
| JP | 2016-130971 A | 7/2016 |
| WO | 2015/111507 A1 | 7/2015 |

OTHER PUBLICATIONS

Google translation of DE 1000919 (Year: 2001).*
Communication dated Jul. 25, 2017 from the Japanese Patent Office in counterpart application No. 2016-153343.

* cited by examiner

F I G. 7
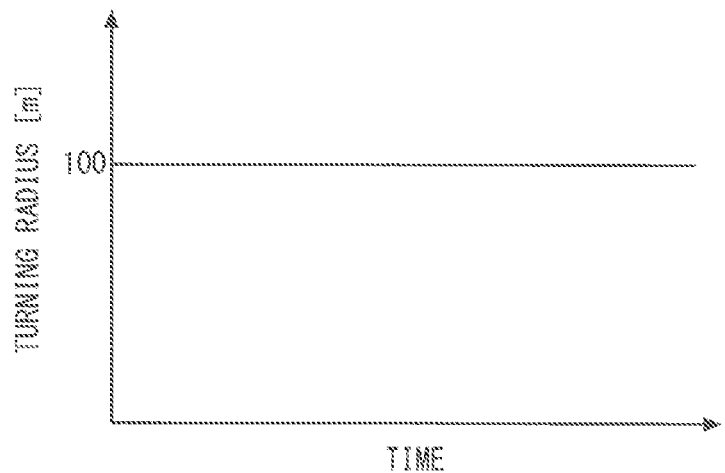
F I G. 8
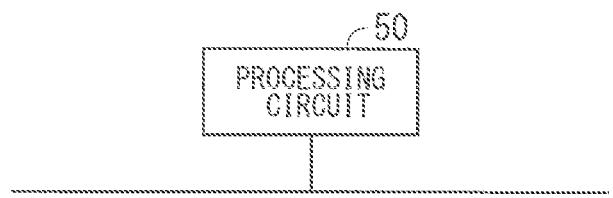
F I G. 9
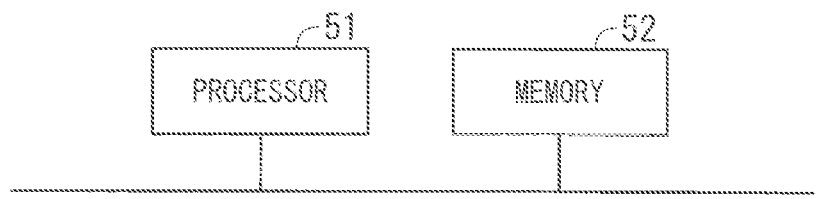

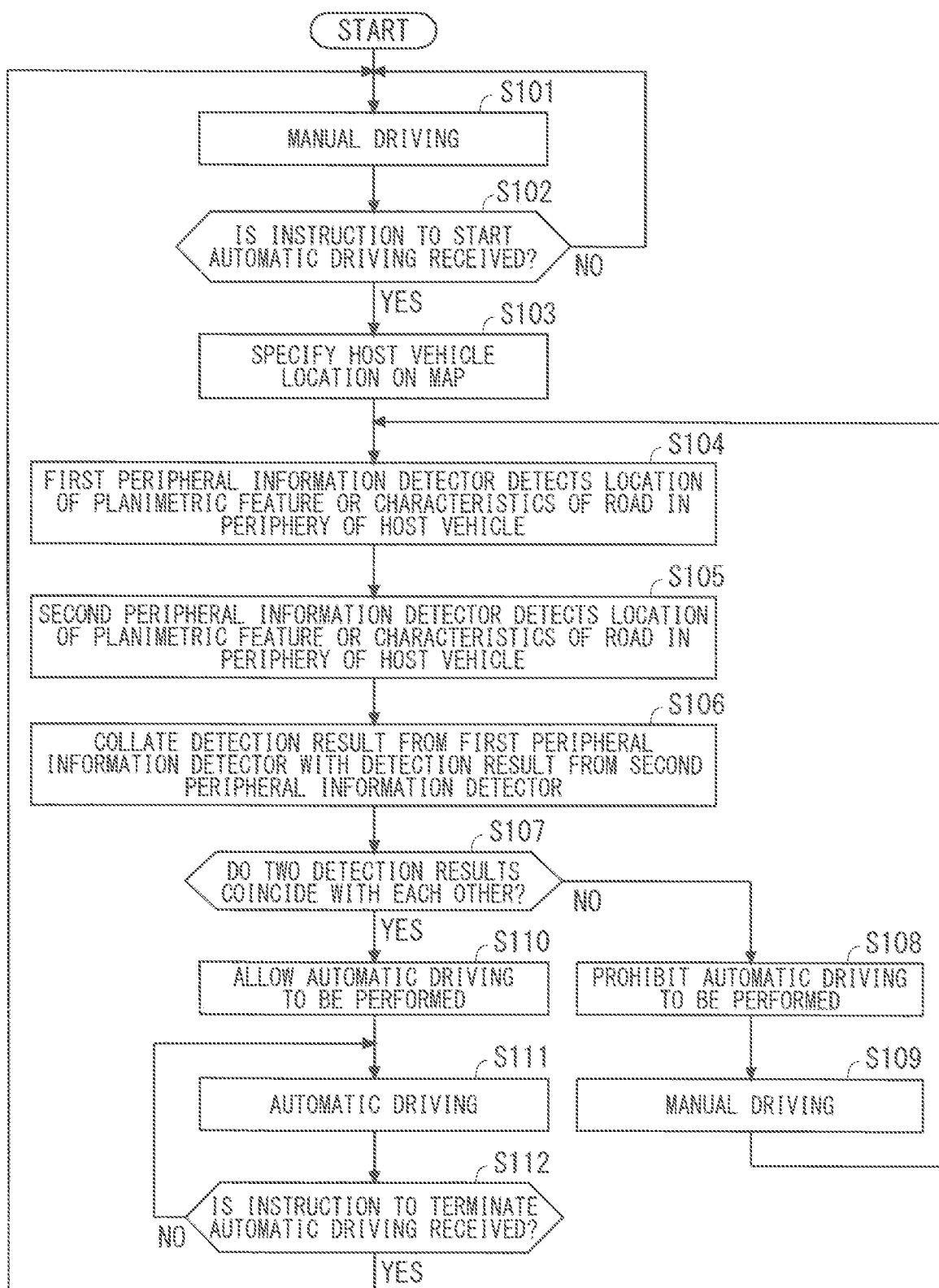

F I G. 1 1
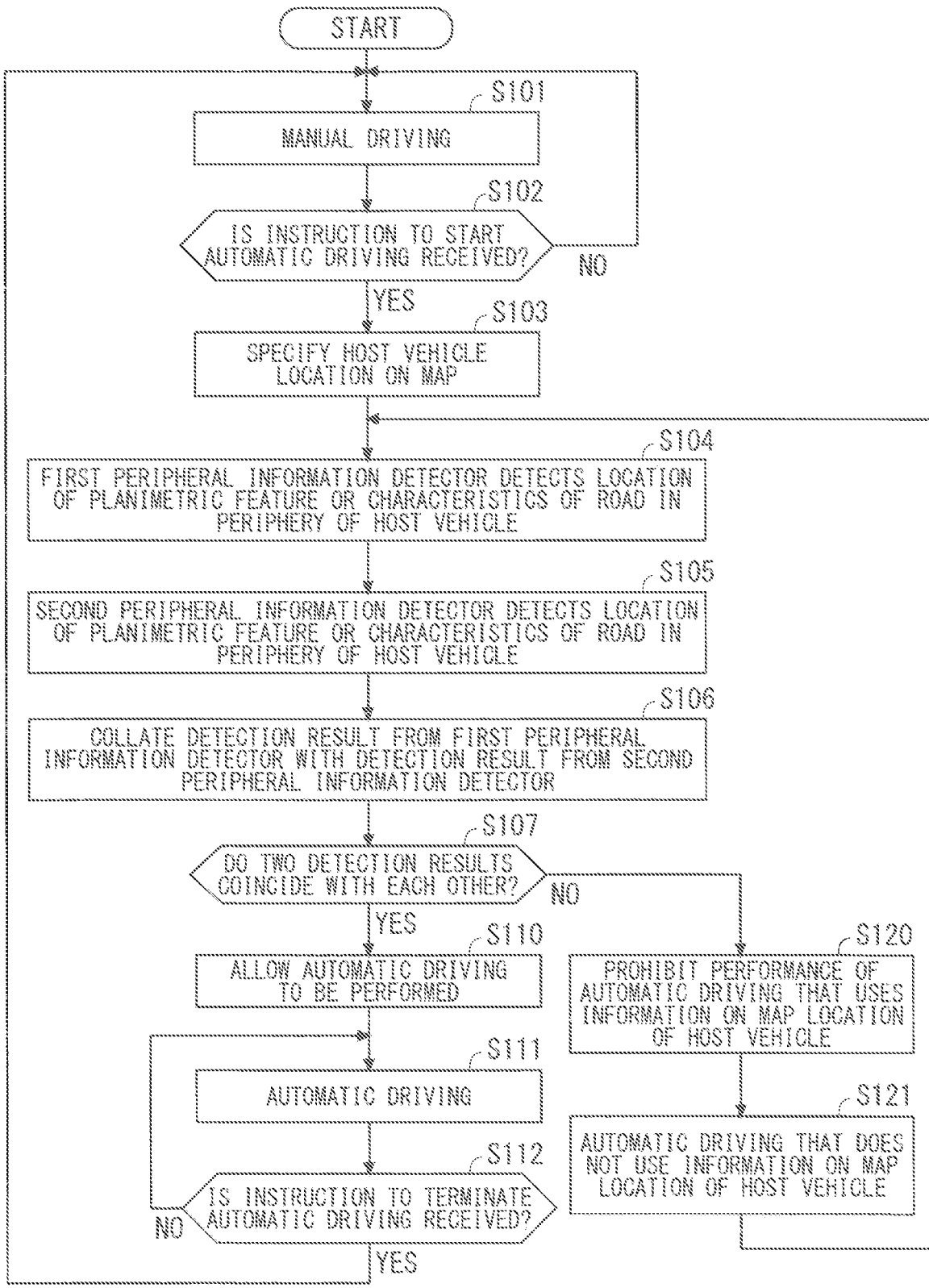

VEHICLE TRAVELING CONTROL DEVICE AND VEHICLE TRAVELING CONTROL METHOD

BACKGROUND OF THE INVENTION

Field of the Invention

The present invention relates to automatic driving of a vehicle and, in particular, to automatic driving using map data.

Description of the Background Art

In recent years, an automatic driving (automatic traveling) technology is being developed in which a vehicle is made to travel along a previously set route. For example, International Publication No. WO2015/111507 proposes a technology in which a vehicle is made to automatically travel along a recommended route retrieved by a navigation device.

In order to make a vehicle travel automatically along a previously set route, it is necessary to specify a vehicle location on a map with high accuracy. If automatic driving is started in a state that a vehicle location on a map is not accurately specified, it is difficult to make the vehicle travel automatically along the right route. For example, there is a possibility of the vehicle deviating from the lane or traveling on the wrong route during automatic traveling.

SUMMARY OF THE INVENTION

An object of the present invention is to provide a vehicle traveling control device which can prevent automatic driving from being performed in a state that a vehicle location on a map is not specified correctly.

A vehicle traveling control device according to the present invention is equipped with: a processor which executes a program; and a memory which stores a program and in which, the following first to fifth processes are performed when the program is executed by the processor. The first process is to perform a host vehicle location specification process in which a host vehicle location on a map is specified based on a location of a host vehicle obtained by using a positioning signal from a positioning satellite and based on map data. The second process is to perform a first peripheral information detection process in which a location of a planimetric feature or characteristics of a road in a periphery of the host vehicle are specified based on the host vehicle location on the map specified by the host vehicle location specification process and based on the map data. The third process is to perform a second peripheral information detection process in which a location of a planimetric feature or characteristics of a road in a periphery of the host vehicle is detected from information acquired by a camera, a sensor, or a road-vehicle communication device mounted on the host vehicle. The fourth process is to determine whether the host vehicle location on the map specified by the host vehicle location specification process is correct or not, by collating the location of the planimetric feature or the characteristics of the road detected by the first peripheral information detection process with the location of the planimetric feature or the characteristics of the road detected by the second peripheral information detection process. The fifth process is to restrict performance of automatic driving of the host vehicle until the host vehicle location on the map specified by the host vehicle location specification process is determined to be correct.

Because performance of automatic driving is restricted until a host vehicle location on a map specified by a host vehicle location specification process is determined to be correct, it is possible to prevent a host vehicle from deviating from the lane or traveling on the wrong route during automatic traveling, whereby reliability of automatic driving can be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing an example of a vehicle state quantity calculated from information acquired by a sensor of the host vehicle;

FIGS. 8 and 9 are diagrams each showing an example of a hardware configuration of the vehicle traveling control device;

FIG. 10 is a flowchart showing an operation of a vehicle traveling control device according to a first preferred embodiment;

FIG. 11 is a flowchart showing an operation of a vehicle traveling control device according to a second preferred embodiment.

DESCRIPTION OF THE PREFERRED EMBODIMENTS

First Preferred Embodiment

Figure 1:
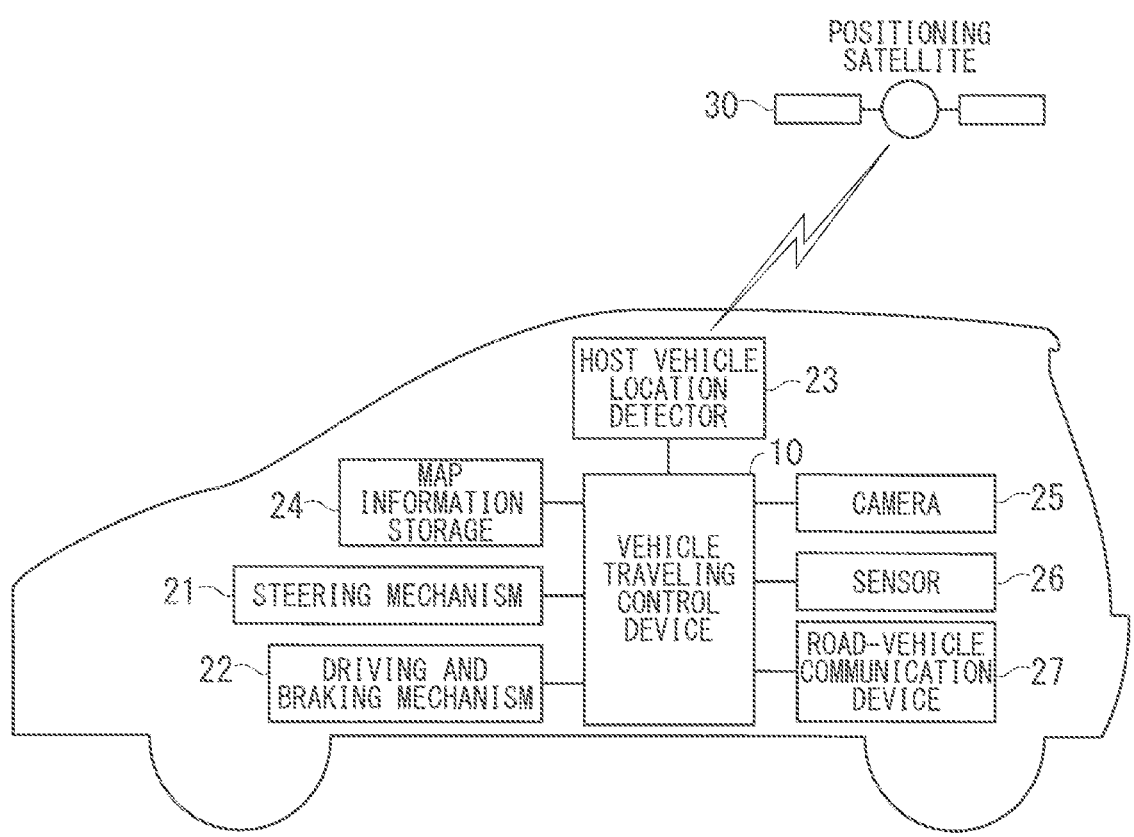
FIG. 1 is a diagram showing a configuration of a vehicle traveling control system according to a preferred embodiment of the present invention.

FIG. 1 is a diagram showing a configuration of a vehicle traveling control system according to the first preferred embodiment. As shown in FIG. 1, this vehicle traveling control system is equipped with a vehicle traveling control device 10 mounted on a vehicle, a steering mechanism 21 connected to the vehicle traveling control device 10, a driving and braking mechanism 22, a host vehicle location detector 23, a map information storage 24, a camera 25, a sensor 26, and a road-vehicle communication device 27. Hereinafter, a vehicle on which the vehicle traveling control device 10 is mounted is referred to as a "host vehicle."

The steering mechanism 21 is a mechanism for turning a traveling direction of the host vehicle to the right and left and include, for example, a steering. The driving and braking mechanism 22 is a mechanism for controlling a traveling speed of the host vehicle and for switching between forward and backward and includes, for example, an accelerator, a brake pedal, and a shifter.

The host vehicle location detector 23 receives a positioning signal, from a positioning satellite 30, provided by a positioning system such as the GPS (Global Positioning System) and detects the location of the host vehicle (hereinafter, referred to as a "host vehicle location") by arithmetic processing based on the received positioning signal. The host vehicle location detected by the host vehicle location detector 23 is the information representing an absolute location (latitude, longitude, or the like) of the host vehicle.

The map information storage 24 is a storage medium in which map data is stored. In the present preferred embodiment, the map data includes the information representing characteristics of a planimetric feature and a road depicted on a map such as a location and a shape of a road, a location and a shape of a building, in addition, a radius of curvature and an inclination (altitude) of a road, a road marking (crosswalk and the like) drawn on a road surface, and the like.

The camera 25, the sensor 26, and the road-vehicle communication device 27 are means for detecting circumstances of the host vehicle and a periphery of the host vehicle. The camera 25 takes an image of a periphery of the host vehicle. The sensor 26 includes, for example, a distance sensor (millimeter-wave radar or the like), a vehicle speed sensor, a longitudinal acceleration sensor, a lateral acceleration sensor, a yaw rate sensor, and a steering angle sensor. The road-vehicle communication device 27 performs communication with a road-side communication device (road-vehicle communication) such as a beacon provided on a road to transmit traffic information and an ETC (Electronic Toll Collection system) gate provided on a toll road.

Figure 2:
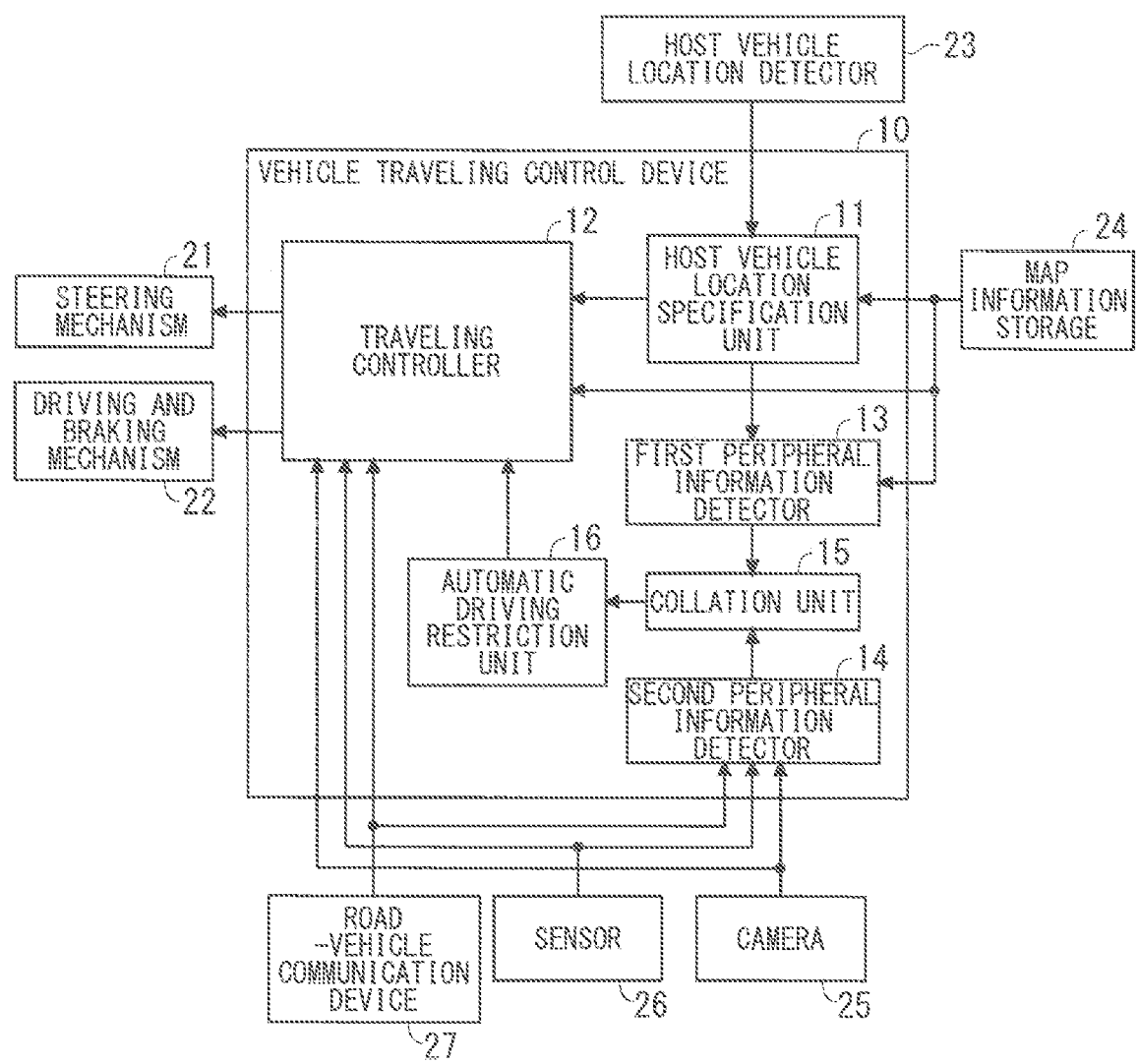
FIG. 2 is a diagram showing a configuration of a vehicle traveling control device according to the preferred embodiment of the present invention.

The vehicle traveling control device 10 controls traveling of the host vehicle by controlling operations of the steering mechanism 21 and the driving and braking mechanism 22. FIG. 2 is a diagram showing a configuration of the vehicle traveling control device 10. As shown in FIG. 2, the vehicle traveling control device 10 is equipped with a host vehicle location specification unit 11, a traveling controller 12, a first peripheral information detector 13, a second peripheral information detector 14, a collation unit 15, and an automatic driving restriction unit 16.

The host vehicle location specification unit 11 acquires data of a host vehicle location from the host vehicle location detector 23, acquires the map data of the periphery of the host vehicle location from the map information storage 24, and then specifies a host vehicle location on a map (hereinafter, referred to as a "host vehicle map location") by collating the both data. That is, the host vehicle map location is the information of the relative location, of the host vehicle, specified with respect to a road on a map.

The traveling controller 12 controls traveling of the host vehicle during automatic driving and manual driving. When the host vehicle is manually driven by a driver, the traveling controller 12 controls the steering mechanism 21 and the driving and braking mechanism 22 following the operation of the steering wheel, the accelerator pedal, the brake pedal, and the like by a driver. On the other hand, when the automatic driving of the host vehicle is performed, the traveling controller 12 automatically controls the steering mechanism 21 and the driving and braking mechanism 22 on the basis of the host vehicle map location specified by the host vehicle location specification unit 11, the map data acquired from the map information storage 24, and various information acquired from the camera 25, the sensor 26, and the road-vehicle communication device 27.

In this manner, the various information acquired by the host vehicle location detector 23, the map information storage 24, the camera 25, the sensor 26, and the road-vehicle communication device 27 is used to control the automatic driving of the host vehicle.

FIG. 2 shows a configuration in which the vehicle traveling control system is equipped with all of the camera 25, the sensor 26, and the road-vehicle communication device 27; however, if the vehicle traveling control device 10 can acquire enough information to perform the automatic driving of the host vehicle, any one or two of the camera 25, the sensor 26, and the road-vehicle communication device 27 may be omitted. In other words, the vehicle traveling control system only has to have at least one of the camera 25, the sensor 26, and the road-vehicle communication device 27. Further, not shown in the drawings, but the vehicle traveling control system may be further equipped with a vehicle-vehicle communication device which acquires the information on the location and the traveling direction of another vehicle by communicating with another vehicle. Note that the above pieces of information may be used for a preventive safety support (for example, a crash-prevention technology, and a lane deviation prevention technology) at the time of manual driving of the host vehicle.

The first peripheral information detector 13 detects the location, on a map, of a planimetric feature or characteristics of a road in a periphery of the host vehicle, based on the host vehicle map location specified by the host vehicle location specification unit 11 and based on the map data acquired from the map information storage 24. That is, the first peripheral information detector 13 calculates, on the basis of the map data, the positional relationship (the distance and direction viewed from the host vehicle) between the host vehicle map location and the planimetric feature located on a map, and calculates a numerical value representing the characteristics of the road on which the host vehicle is traveling.

As the planimetric feature to be detected by the first peripheral information detector 13 may include, for example, buildings, road signs, traffic lights, kilometer posts, tollbooths, and road-side communication devices (e.g. ECT gates and beacons). Further, the characteristics to be detected by the first peripheral information detector 13 may include the shape, curvature, and inclination of the road on which the host vehicle is traveling, the positional relationship between the host vehicle and a road marking drawn on the road surface, the positional relationship between the host vehicle and an intersection, and the like.

The second peripheral information detector 14 detects a location of a planimetric feature or characteristics of a road in the periphery of the host vehicle on the basis of the information acquired by the camera 25, the sensor 26, or the road-vehicle communication device 27 mounted on the host vehicle. Specifically, the second peripheral information detector 14 calculates (i) the positional relationship between the actual host vehicle location and the planimetric feature in the periphery of the actual host vehicle location and (ii) a numerical value representing the characteristics of the road on which the host vehicle is traveling. The calculation is performed on the basis of the image in the periphery of the host vehicle taken by the camera 25, the positional relationship between the planimetric feature detected by the sensor 26 and the host vehicle, the vehicle state quantity of the host vehicle calculated from the output of the sensor 26, the positional relationship between the location of a planimetric feature known from the information received by the road-vehicle communication device 27 and the host vehicle, and other information.

The items to be detected by the second peripheral information detector 14 correspond to the items having been detected by the first peripheral information detector 13. That is, the second peripheral information detector 14 detects the items having been detected by the first peripheral information detector 13, by not using the host vehicle map location.

For example, the second peripheral information detector 14 can obtain the locations of a building, a road sign, a traffic light, a kilometer post, a tollbooth, a road marking, and an intersection as well as the shape of a road, by analyzing the image taken by the camera 25 and the output of the distance sensor functioning as the sensor 26. Further, the location of a road-side communication device can be determined from the signal received by the road-vehicle communication device 27.

The shape and inclination of the road on which the host vehicle is traveling can be obtained from the vehicle state quantity calculated from the output of the sensor 26. Here, assuming that the sensor 26 includes a vehicle speed sensor, a longitudinal acceleration sensor, a lateral acceleration sensor, a yaw rate sensor, and a steering angle sensor, the values detected by the sensors are defined such that a traveling speed is defined as V, a longitudinal acceleration as $A_x$, a lateral acceleration as $A_y$, a yaw rate as Y, and a steering angle of the host vehicle as θ.

With these definitions, the inclination of the road on which the host vehicle is traveling can be obtained from the relational expression:

$$\Delta A_g = \Delta V - A_x \quad \text{Equation 1}$$

The value ΔV is a differential value (dV/dt) of the traveling speed V of the host vehicle, and $\Delta A_g$ is an effect from a slope with respect to the gravitational acceleration.

Further, a radius of curvature of the road on which the host vehicle is traveling can be obtained as a turning radius R of the host vehicle calculated from the following relational expression:

$$R = V/Y \quad \text{Equation 2}$$

Note that, in the case that the sensor 26 does not include a yaw rate sensor, the yaw rate Y can be calculated by the following relational expression:

$$Y = 1/(1 + C \cdot V^2) \cdot V \cdot \theta \cdot G/L \quad \text{Equation 3}$$

or $$Y = A_y/V \quad \text{Equation 4}$$

In Equation 3, C is an inherent value of the host vehicle, G is a steering gear ratio, and L is a wheelbase (the distance between the front wheel axle and the rear wheel axle distance).

The collation unit 15 collates the location of the planimetric feature or the characteristics of the road detected by the first peripheral information detector 13 with the location of the planimetric feature or the characteristics of the road detected by the second peripheral information detector 14. The collation unit 15 determines, from the result of the collation, whether the host vehicle map location specified by the host vehicle location specification unit 11 is correct or not.

Figure 3:
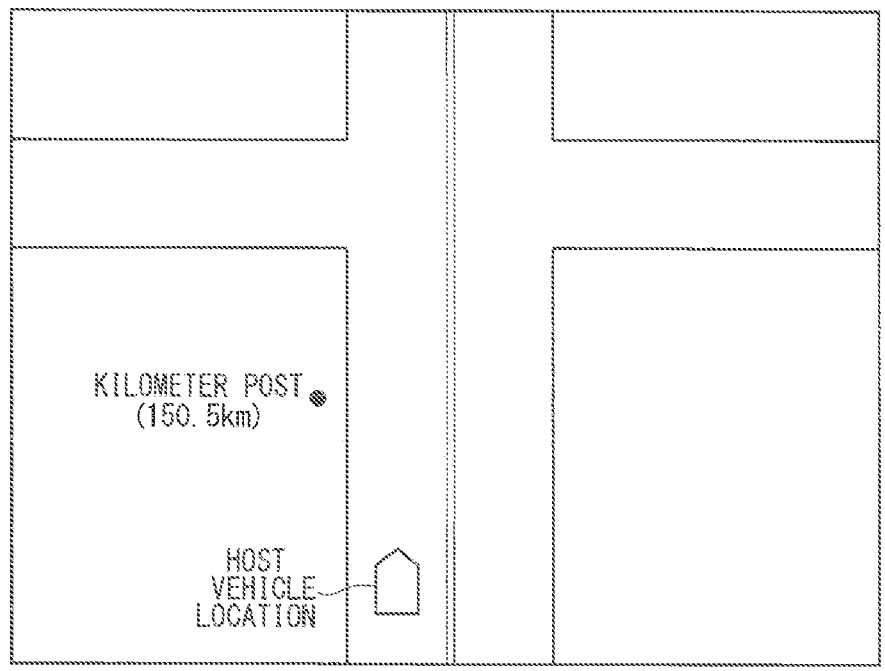
FIG. 3 is a diagram showing an example of a host vehicle map location specified by a host vehicle location specification unit.
Figure 4:
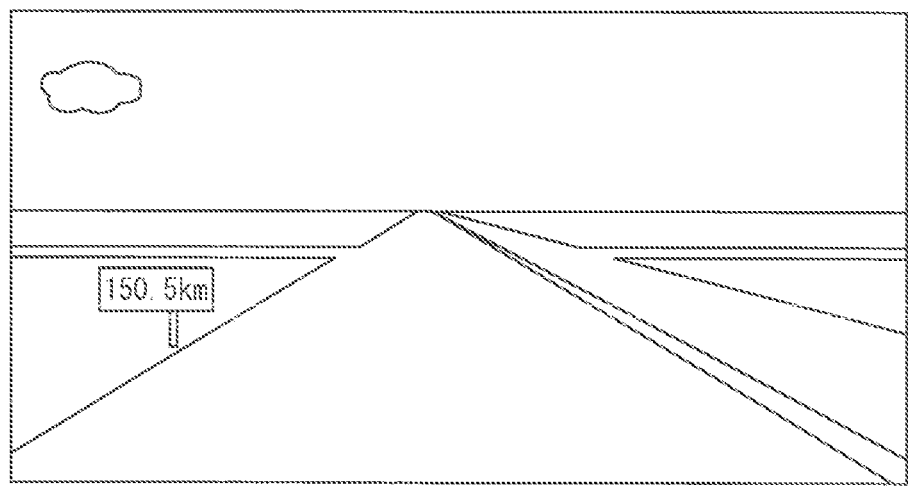
FIGS. 4 and 5 are diagrams each showing an example of an image taken by a camera of a host vehicle.

For example, it is assumed herein that the host vehicle location specification unit 11 has specified the host vehicle map location as shown in FIG. 3. In this case, the first peripheral information detector 13 detects, from the map data, that a kilometer post of "150.5 km" is 10 m ahead of the host vehicle and that an intersection is 20 m ahead of the host vehicle. In this situation, if the camera 25 takes an image of the forward view of the host vehicle and an image is obtained as shown in FIG. 4, the second peripheral information detector 14 also detects that a kilometer post of "150.5 km" is 10 m ahead of the host vehicle and that an intersection is 20 m ahead of the host vehicle. In the case that the detection result from the first peripheral information detector 13 coincides with the detection result from the second peripheral information detector 14 as described above, the collation unit 15 determines that the host vehicle map location specified by the host vehicle location specification unit 11 is correct.

Figure 5:
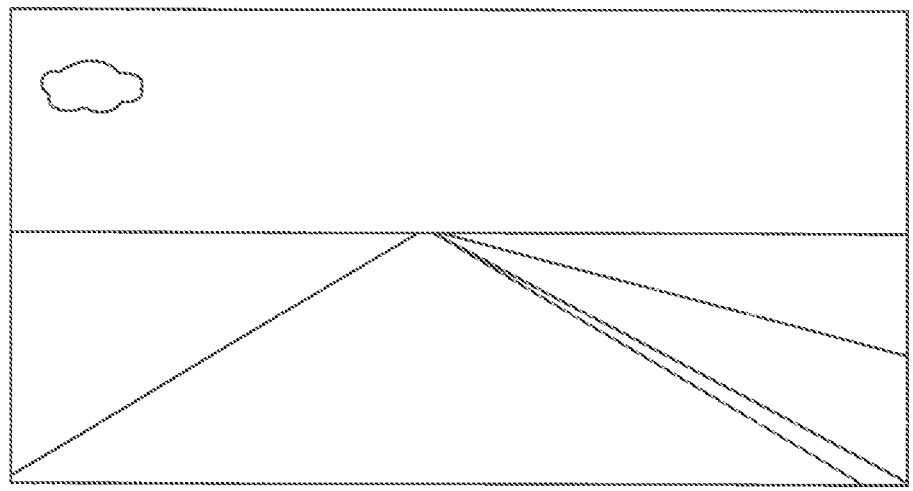

However, if the camera 25 takes an image of the forward view of the host vehicle and an image is obtained, for example, as shown in FIG. 5, none of the above kilometer post and intersection is detected by the second peripheral information detector 14. In this case, the collation unit 15 determines that the host vehicle map location specified by the host vehicle location specification unit 11 is incorrect.

Figure 6:
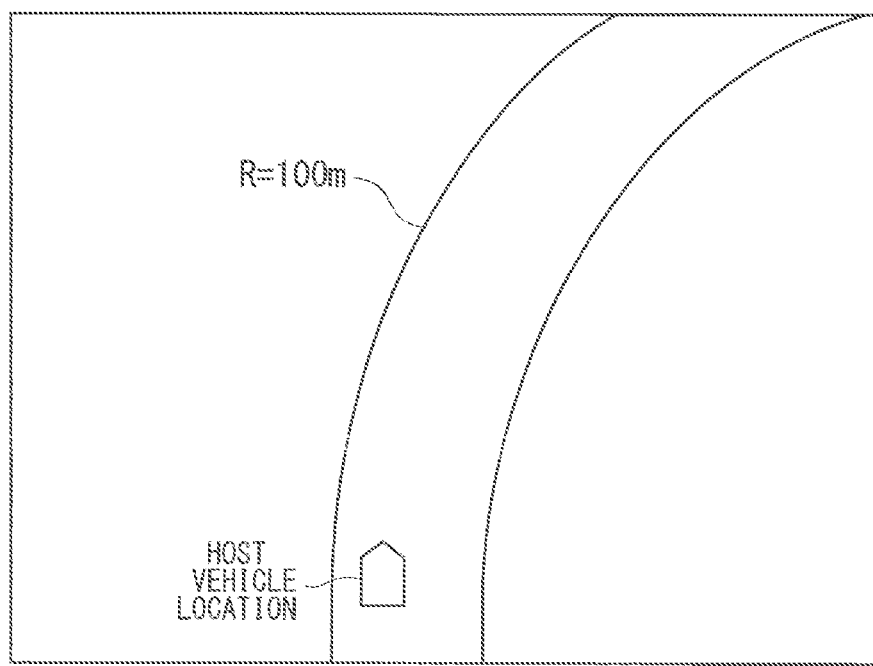
FIG. 6 is a diagram showing an example of a host vehicle map location specified by the host vehicle location specification unit.

Further, for example, it is assumed herein that the host vehicle location specification unit 11 has specified the host vehicle map location as shown in FIG. 6. In this case, the first peripheral information detector 13 detects, from the map data, that the radius of curvature of the road on which the host vehicle is traveling is 100 m. In this situation, in the case that the second peripheral information detector 14 calculates as the vehicle state quantity the turning radius of the host vehicle from the output of the sensor 26 and from above Equation 2 and that the result is 100 m as shown in FIG. 7, the detection result from the first peripheral information detector 13 coincides with the detection result from the second peripheral information detector 14. Therefore, the collation unit 15 determines that the host vehicle map location specified by the host vehicle location specification unit 11 is correct. However, if the calculation result of the turning radius of the host vehicle has a value different from 100 m, the collation unit 15 determines that the host vehicle map location specified by the host vehicle location specification unit 11 is incorrect.

The range in which the collation unit 15 determines that the detection result from the first peripheral information detector 13 coincides with the detection result from the second peripheral information detector 14 may have some margin. For example, the results can be determined to be identical when the difference between the two results is 10% or less.

The automatic driving restriction unit 16 refers to the result of determination by the collation unit 15, and if it has been determined that the host vehicle map location specified by the host vehicle location specification unit 11 is correct, the automatic driving restriction unit 16 allows the traveling controller 12 to perform automatic driving of the host vehicle. However, if it has not been determined that the host vehicle map location specified by the host vehicle location specification unit 11 is correct, the automatic driving restriction unit 16 controls the traveling controller 12 such that the performance of automatic driving of the host vehicle is restricted. In the preferred embodiment, if it has not been determined that the host vehicle map location specified by the host vehicle location specification unit 11 is correct, the automatic driving restriction unit 16 restricts all of the functions of automatic driving, in other words, prohibits automatic driving from being performed.

As described above, automatic driving of the host vehicle is prohibited from being performed until the host vehicle map location specified by the host vehicle location specification unit 11 is determined to be correct; therefore, it is possible to prevent automatic driving in a state that a vehicle location on a map is not specified accurately.

FIG. 8 and FIG. 9 are diagrams each showing an example of a hardware configuration of the vehicle traveling control device 10. The respective elements of the vehicle traveling control device 10 shown in FIG. 1, which elements are the host vehicle location specification unit 11, the traveling controller 12, the first peripheral information detector 13, the second peripheral information detector 14, the collation unit 15, and the automatic driving restriction unit 16, are realized by, for example, a processing circuit 50 shown in FIG. 8. Specifically, the processing circuit 50 is equipped with: the traveling controller 12 which controls traveling of the host vehicle on the basis of the map data and the absolute location of the host vehicle obtained by using a positioning signal from the positioning satellite 30; the host vehicle location specification unit 11 which specifies a host vehicle map location; the first peripheral information detector 13 which detects the location of a planimetric feature or the characteristics of a road in the periphery of the host vehicle on the basis of the map data and the host vehicle map location specified by the host vehicle location specification unit 11; the second peripheral information detector 14 which detects the location of a planimetric feature or the characteristics of a road in the periphery of the host vehicle on the basis of the information acquired by the camera 25, the sensor 26, or the road-vehicle communication device 27 mounted on the host vehicle; the collation unit 15 which determines whether the host vehicle map location specified by the host vehicle location specification unit 11 is correct or not, by collating the location of the planimetric feature or the characteristics of the road detected by the first peripheral information detector 13 with the location of the planimetric feature or the characteristics of the road detected by the second peripheral information detector 14; and the automatic driving restriction unit 16 which restricts performance of automatic driving of the host vehicle until the host vehicle map location specified by the host vehicle location specification unit 11 is determined to be correct. To the processing circuit 50, dedicated hardware may be applied, or a processor (such as a central processing unit, a central processing device, a processing device, an operation device, a microprocessor, a microcomputer, and a digital signal processor) which executes a program stored in a memory may be applied.

In the case that the processing circuit 50 is dedicated hardware, it is possible to use as the processing circuit 50, for example, a single circuit, a composite circuit, a programmed processor, a parallelly programmed processor, an ASIC, an FPGA, or a circuit in which these components are combined. Each of the functions of the respective elements of the vehicle traveling control device 10 may be realized by a plurality of processing circuits, or those functions may be realized integrally by a single processing circuit.

FIG. 9 shows a hardware configuration of the vehicle traveling control device 10 in the case that the processing circuit 50 is configured by using a processor. In this case, the functions of the respective elements of the vehicle traveling control device 10 are realized by a combination of software and the like (software, firmware, or software and firmware). Software and the like are described as a program and are stored in a memory 52. A processor 51 functioning as the processing circuit 50 realizes the functions of respective parts by reading out and executing the program stored in the memory 52. That is, the vehicle traveling control device 10 is equipped with the memory 52 for storing a program, where, when the program is executed by the processing circuit 50, the following processes are performed as a result: a process in which the host vehicle map location is specified on the basis of the map data and the absolute location of the host vehicle obtained by using the positioning signal from the positioning satellite 30; a first peripheral information detection process in which the location of a planimetric feature or the characteristics of a road in the periphery of the host vehicle is detected from the specified host vehicle map location and the map data; a second peripheral information detection process in which the location of a planimetric feature or the characteristics of a road in the periphery of the host vehicle is detected on the basis of the information acquired by the camera 25, the sensor 26, or the road-vehicle communication device 27 mounted on the host vehicle; a process in which it is determined whether the host vehicle map location is correct or not, by collating the location of the planimetric feature or the characteristics of the road detected by the first peripheral information detection process with the location of the planimetric feature or the characteristics of the road detected in the second peripheral information detection process; and a process in which performance of automatic driving of the host vehicle is restricted until the specified host vehicle map location is determined to be correct. In other words, this program can also be said to be a program which makes a computer perform procedures and methods of the operations of the respective elements of the vehicle traveling control device 10.

In this arrangement, for example, the following devices correspond to the memory 52: a volatile or non-volatile semiconductor memory such as a RAM (Random Access Memory), a ROM (Read Only Memory), a flash memory, an EPROM (Erasable Programmable Read Only Memory), and an EEPROM (Electrically Erasable Programmable Read Only Memory), an HDD (Hard Disk Drive), a magnetic disc, a flexible disc, an optical disc, a compact disc, a MiniDisc, a DVD (Digital Versatile Disc), and drive devices for these storage media.

Configurations are described above in which the functions of the respective elements of the vehicle traveling control device 10 are realized by any one of hardware, software, and the like. However, the configuration is not limited to the above configurations, and the configuration may be realized such that some of the elements of the vehicle traveling control device 10 are realized by dedicated hardware and the other of the elements are realized by software and the like. For example, it is possible that the functions of some of the elements are realized by the processing circuit 50 made up of dedicated hardware and that the function of the other of the elements are realized by the processing circuit 50 functioning as the processor 51, where the processing circuit 50 reads out and executes a program stored in the memory 52.

As described above, regarding the vehicle traveling control device 10, the above respective functions can be realized by hardware, software, and the like or a combination of hardware, software, and the like.

FIG. 10 is a flowchart showing an operation of the vehicle traveling control device 10 according to the first preferred embodiment. Hereinafter, an operation of the vehicle traveling control device 10 will be described with reference to FIG. 10.

When the vehicle traveling control device 10 is started, the traveling controller 12 gets in an operation mode in which manual driving of the host vehicle is performed (step S101). Then, if a driver sets a destination and the like and the vehicle traveling control device 10 receives an instruction to start automatic driving (step S102: YES), the host vehicle location specification unit 11 specifies the host vehicle map location by collating the data of the host vehicle location acquired from the host vehicle location detector 23 with the map data acquired from the map information storage 24 (step S103).

Next, the first peripheral information detector 13 detects the map location of a planimetric feature or the characteristics of a road in a periphery of the host vehicle, from the host vehicle map location specified by the host vehicle location specification unit 11 and the map data acquired from the map information storage 24 (step S104). Further, the second peripheral information detector 14 detects the location of a planimetric feature or the characteristics of a road in the periphery of the host vehicle from the information acquired by the camera 25, the sensor 26, or the road-vehicle communication device 27 (step S105).

Subsequently, the collation unit 15 collates the detection result from the first peripheral information detector 13 in step S104 with the detection result from the second peripheral information detector 14 in step S105 (step S106). If the two detection results do not coincide with each other (step S107: NO), the automatic driving restriction unit 16 prohibits the traveling controller 12 from performing automatic driving (step S108). In this case, the process goes back to step S104 while making the traveling controller 12 continue manual driving (step S109). The process repeats the processing from step S104 to step S109 until the detection result from the first peripheral information detector 13 and the detection result from the second peripheral information detector 14 coincide each other.

If the detection result from the first peripheral information detector 13 and the detection result from the second peripheral information detector 14 coincide with each other (step S107: YES), the automatic driving restriction unit 16 allows the traveling controller 12 to perform automatic driving (step S110). On response to this operation, the traveling controller 12 performs automatic driving of the host vehicle (step S111).

After that, if the vehicle traveling control device 10 receives the instruction to terminate the automatic driving (step S112: YES), the process goes back to step S101. The instruction to terminate automatic driving is input to the vehicle traveling control device 10, for example, when a driver performs an override operation or when the host vehicle arrives at a destination.

As described above, in the present preferred embodiment, the performance of automatic driving of the host vehicle is restricted until the location of the planimetric feature or the characteristics of the road detected by the first peripheral information detector 13 and the location of the planimetric feature or the characteristics of the road detected by the second peripheral information detector 14 coincide with each other and until it is therefore determined that the host vehicle map location specified by the host vehicle location specification unit 11 is correct. By this operation, automatic driving is restricted in the state that a vehicle location on a map is not accurately specified. As a result, it is possible to prevent the host vehicle from deviating from the lane and traveling on the wrong mute, and it is therefore possible to improve the reliability on automatic driving.

Second Preferred Embodiment

In the first preferred embodiment, when the host vehicle map location specified by the host vehicle location specification unit 11 is not determined to be correct, automatic driving is perfectly prohibited from being performed (all of the functions of automatic driving are restricted); however, in a second preferred embodiment, only part of the functions of automatic driving are restricted.

FIG. 11 is a flowchart showing an operation of the vehicle traveling control device 10 according to the second preferred embodiment. The flow in FIG. 11 is a flow made by replacing step S108 for prohibiting automatic driving and step S109 for continuing manual driving both in the flow of FIG. 10 with step S120 for prohibiting the automatic driving using the information on the host vehicle map location and step S121 for performing the automatic driving not using the information on the host vehicle map location, respectively.

That is, in the second preferred embodiment 2, if the detection result from the first peripheral information detector 13 and the detection result from the second peripheral information detector 14 do not coincide with each other and if the host vehicle map location specified by the host vehicle location specification unit 11 is therefore not determined to be correct (step S107: NO), the automatic driving using the information on the host vehicle map location is prohibited from being performed (step S120), but the automatic driving using only other information, that is, the information acquired from the camera 25, the sensor 26, and the road-vehicle communication device 27 is allowed to be performed (step S121). In step S121, for example, the automatic driving by an autonomous navigation using only the information from the camera 25 and the sensor 26 is performed.

With the second preferred embodiment, while it is not determined that the host vehicle map location specified by the host vehicle location specification unit 11 is correct, automatic driving is not perfectly prohibited, but automatic driving is performed with part of the functions being restricted; therefore, deterioration in convenience is kept small until the host vehicle map location is determined to be correct.

Third Preferred Embodiment

In a third preferred embodiment, when the host vehicle map location specified by the host vehicle location specification unit 11 is not determined to be correct, the automatic driving restriction unit 16 limits the traveling speed at the time of automatic driving.

Figure 12:
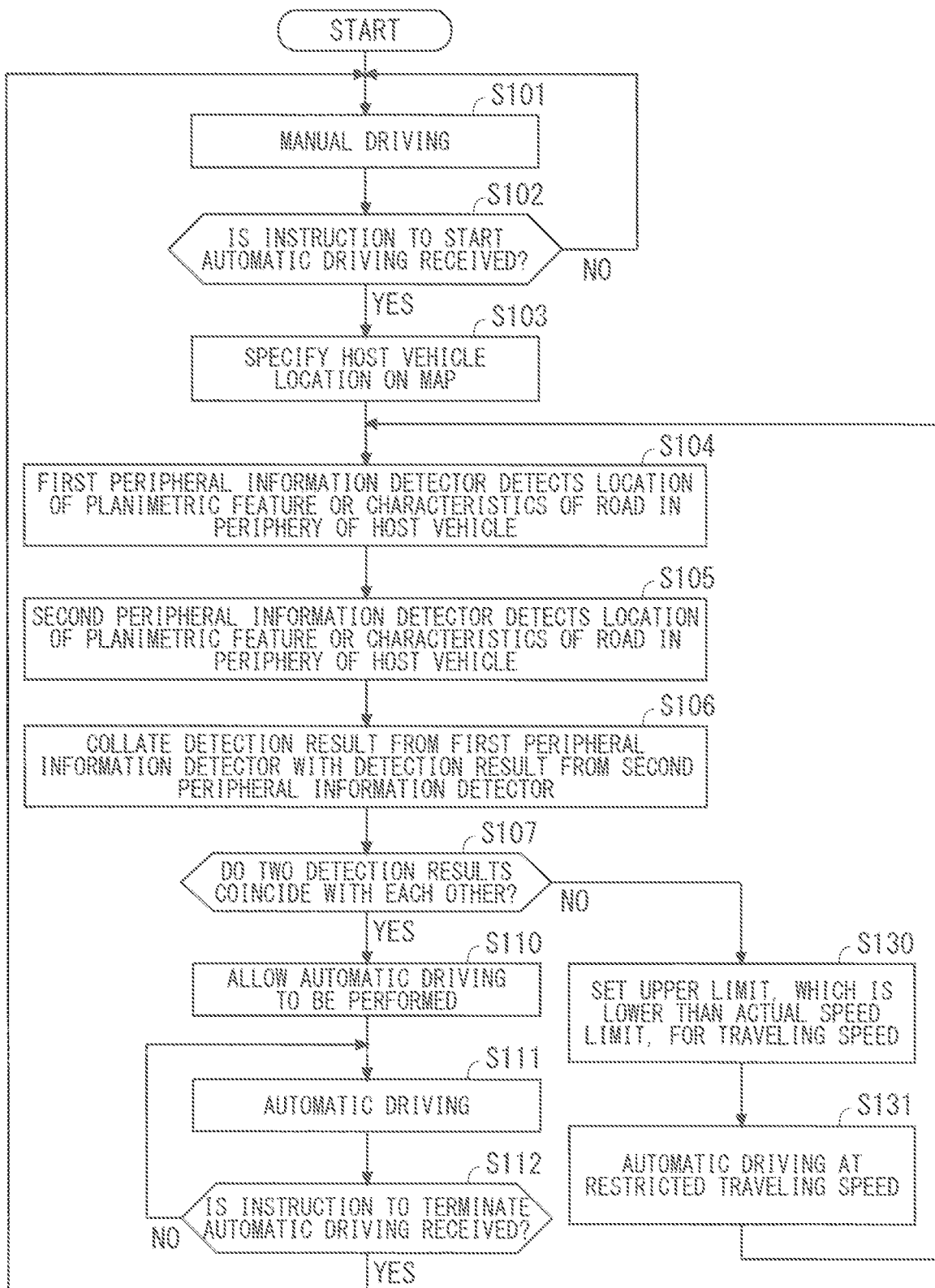
FIG. 12 is a flowchart showing an operation of a vehicle traveling control device according to a third preferred embodiment.

FIG. 12 is a flowchart showing an operation of the vehicle traveling control device 10 according to the third preferred embodiment. The flow in FIG. 12 is a flow made by replacing step S108 for prohibiting the performance of automatic driving and step S109 for continuing manual driving of the flow in FIG. 10 with step S130 for setting the upper limit for the traveling speed of the host vehicle and step S131 for performing the automatic driving at a restricted traveling speed, respectively.

That is, in the third preferred embodiment, if the detection result from the first peripheral information detector 13 and the detection result from the second peripheral information detector 14 do not coincide with each other, and if the host vehicle map location specified by the host vehicle location specification unit 11 is therefore not determined to be correct (step S107: NO), an upper limit lower than the actual speed limit is set for the traveling speed of the host vehicle (step S130), and automatic driving is performed at a low traveling speed (step S131).

As a way how the vehicle traveling control device 10 knows the actual speed limit in step S130, for example, there may be a way in which the road-vehicle communication device 27 acquires the information on the speed limit through road-vehicle communication, or a way in which the speed limit is read out from an image of a road sign or a road marking which is taken by the camera 25. Alternatively, it is also possible to read out the information on the speed limit of the road on which the host vehicle is located from the map data and to consider the read-out speed limit as the actual speed limit, assuming that the host vehicle map location specified by the host vehicle location specification unit 11 is correct.

With the third preferred embodiment, while the host vehicle map location specified by the host vehicle location specification unit 11 is not determined to be correct, automatic driving is not perfectly prohibited, but automatic driving is performed at a restricted traveling speed; therefore, deterioration in convenience is kept small until the host vehicle map location is determined to be correct. Further, because the automatic driving is performed at a low traveling speed, if there is a possibility of, for example, deviating from the lane, the driver can avoid the deviation with ease.

The third preferred embodiment may be combined with the second preferred embodiment. Specifically, while the host vehicle map location specified by the host vehicle location specification unit 11 is not determined to be correct, the automatic driving not using the information on that host vehicle map location may be performed at a low traveling speed.

Note that, regarding the present invention, within the scope of the present invention, the respective preferred embodiment may be freely combined with one another, or the respective preferred embodiment may be appropriately deformed or omitted.

While the invention has been shown and described in detail, the foregoing description is in all aspects illustrative and not restrictive. It is therefore understood that numerous modifications and variations can be devised without departing from the scope of the invention.

What is claimed is:

1. A vehicle traveling control device comprising:
    a processor to execute a program; and
    a memory to store said program which, when executed by said processor, performs processes of,
    performing a host vehicle location specification process in which a map-based host vehicle location on a map is specified based on map data and a positioning signal received from a positioning satellite by a host vehicle,
    performing a first peripheral information detection process in which map-based characteristics of a road in a periphery of said host vehicle are detected, based on said map data and said map-based host vehicle location, the map-based characteristics of the road comprising a traffic sign and a first road curvature included in the map data,
    obtaining at least a yaw rate, based on a steering gear ratio, a speed of said host vehicle that is measured by a speed sensor mounted on said host vehicle, and a distance between a front wheel axle and a rear wheel axle of said host vehicle,
    obtaining a front view image of said host vehicle by a camera sensor mounted on said host vehicle,
    performing a second peripheral information detection process in which sensor-based characteristics of a road in a periphery of said host vehicle are detected from a vehicle state quantity indicating a state of said host vehicle to determine a sensor-based host vehicle location, said vehicle state quantity being calculated from at least the yaw rate acquired by the speed sensor, the sensor-based characteristics of the road comprising a second road curvature estimated from the yaw rate, and an object detected from the front view image of said host vehicle,
    determining whether said map-based host vehicle location matches said sensor-based host vehicle location, based on comparison between the traffic sign included in the map data and the object detected from the front view image, and between the first road curvature included in the map data and the second curvature estimated from the yaw rate that is obtained based on the steering gear ratio, the speed of said host vehicle, and the distance between the front wheel axle and the rear wheel axle of said host vehicle, and
    restricting performance of automatic driving of said host vehicle until said map-based host vehicle location is determined to be correct,
    wherein in response to determining that said map-based host vehicle location does not match said sensor-based host vehicle location, said processor allows said host vehicle to perform automatic driving without using said map data and information on said map-based host vehicle location on said map but using said information acquired by said speed sensor and camera sensor, and traffic information received by a communication device of the host vehicle.

2. The vehicle traveling control device according to claim 1, wherein when said map-based host vehicle location is not determined to be correct, said processor sets an upper limit, which is lower than an actual speed limit, for a traveling speed of the host vehicle at a time of automatic driving.

3. The vehicle traveling control device according to claim 1, wherein said map-based characteristics of the road further include any one of a shape of the road, an inclination of the road, a location of a road marking, and a location of an intersection.

* * * * *